United States Patent
Weyerhaeuser et al.

(10) Patent No.: US 9,753,981 B2
(45) Date of Patent: Sep. 5, 2017

(54) HIERARCHICAL RUNTIME SETTINGS WITHIN DISTRIBUTED QUERY EXECUTION FRAMEWORKS

(71) Applicants: Christoph Weyerhaeuser, Heidelberg (DE); Tobias Mindnich, Sulzbach (DE); Johannes Merx, Heidelberg (DE); Joerg Schad, Leimen (DE); Julian Schwing, Mannheim (DE)

(72) Inventors: Christoph Weyerhaeuser, Heidelberg (DE); Tobias Mindnich, Sulzbach (DE); Johannes Merx, Heidelberg (DE); Joerg Schad, Leimen (DE); Julian Schwing, Mannheim (DE)

(73) Assignee: SAP SE, Walldorf (DE)

( * ) Notice: Subject to any disclaimer, the term of this patent is extended or adjusted under 35 U.S.C. 154(b) by 516 days.

(21) Appl. No.: 14/205,007

(22) Filed: Mar. 11, 2014

(65) Prior Publication Data

US 2015/0261822 A1    Sep. 17, 2015

(51) Int. Cl.
*G06F 17/30* (2006.01)

(52) U.S. Cl.
CPC .............. *G06F 17/30477* (2013.01)

(58) Field of Classification Search
None
See application file for complete search history.

(56) References Cited

U.S. PATENT DOCUMENTS

| | | | |
|---|---|---|---|
| 6,609,123 B1 * | 8/2003 | Cazemier | G06F 17/30607 |
| 7,099,879 B2 | 8/2006 | Tacaille et al. | |
| 7,451,071 B2 | 11/2008 | Ferguson et al. | |
| 7,743,012 B2 | 6/2010 | Chambers et al. | |
| 8,195,643 B2 | 6/2012 | Weyerhaeuser et al. | |
| 8,312,045 B2 | 11/2012 | Zenz | |
| 8,583,678 B2 | 11/2013 | Vainer et al. | |
| 8,666,968 B2 | 3/2014 | Sachs et al. | |
| 2002/0062334 A1 | 5/2002 | Chen et al. | |
| 2011/0282704 A1 | 11/2011 | Graeber et al. | |
| 2012/0109934 A1 * | 5/2012 | Weyerhaeuser | G06F 17/30463 707/713 |
| 2012/0221549 A1 | 8/2012 | Weyerhaeuser et al. | |
| 2013/0166497 A1 | 6/2013 | Schroetel et al. | |
| 2013/0166566 A1 | 6/2013 | Lemke et al. | |
| 2013/0166892 A1 | 6/2013 | Sachs et al. | |
| 2013/0245804 A1 | 9/2013 | Sinzig et al. | |
| 2013/0290292 A1 | 10/2013 | Weyerhaeuser et al. | |
| 2013/0290298 A1 | 10/2013 | Weyerhaeuser et al. | |
| 2013/0290354 A1 | 10/2013 | Weyerhaeuser et al. | |

* cited by examiner

*Primary Examiner* — Belix M Ortiz Ditren
(74) *Attorney, Agent, or Firm* — Mintz Levin Cohn Ferris Glovsky and Popeo, P.C.

(57) ABSTRACT

A query is received by a database server from a remote application server. The query is associated with a calculation scenario that defines a data flow model that includes one or more calculation nodes. The calculation nodes each define one or more operations to execute by a calculation engine on the database server. Thereafter, the database server instantiates a runtime model of the calculation scenario by accessing a local settings object stored with the calculation scenario that specifies local settings for the calculation scenario. Subsequently, the database server executes the operations defined by the calculation nodes of the instantiated calculation scenario to result in a responsive data set. The data set can then be provided by the database server to the application server.

20 Claims, 3 Drawing Sheets

HIERARCHICAL RUNTIME SETTINGS WITHIN DISTRIBUTED QUERY EXECUTION FRAMEWORKS

TECHNICAL FIELD

The subject matter described herein relates to hierarchical run-time settings within distributed query execution frameworks such as those employing calculation engines.

BACKGROUND

Distributed query execution frameworks, such as a calculation engine executing calculation scenarios, are increasingly being adopted. Some such frameworks provide that a set of configuration parameters can be managed on a global per server instance level. These configuration parameters can be required to setup and maintain a valid infrastructure such as a maximum size of a calculation scenario cache. In addition, the configuration parameters can specify the effect the execution of calculation scenarios. However, by allowing for the configuration parameters to be managed on a global basis, the parameters cannot be changed for dedicated calculation scenarios or queries because they are applied per server instance.

In a distributed query execution framework, consistency must be kept among configuration settings between servers. Consider for example that the configuration parameters for server A allows for a certain optimization, while the configuration parameters for server B do not permit such an optimization. As a result, the overall query performance would be dependent on which parts of the queries are executed on which of the two servers.

Furthermore, issues can arise when global configuration settings are changed during query runtime. With such a scenario (especially with long running queries), a first portion of them can be executed with the old settings while a second portion can be executed with the new settings, thereby negatively affecting query performance.

SUMMARY

In a first aspect, a query is received by a database server from a remote application server. The query is associated with a calculation scenario that defines a data flow model that includes one or more calculation nodes. The calculation nodes each define one or more operations to execute by a calculation engine on the database server. Thereafter, the database server instantiates a runtime model of the calculation scenario by accessing a local settings object stored with the calculation scenario that specifies local settings for the calculation scenario. Subsequently, the database server executes the operations defined by the calculation nodes of the instantiated calculation scenario to result in a responsive data set. The data set can then be provided by the database server to the application server.

The local settings can, in some variations, be combined with global settings pertaining to a plurality of calculation scenarios. The combination of the local settings and the global settings can be used when executing the instantiated calculation scenario.

In addition, the query can have associated query settings such that the local settings can be combined with the query settings. The combination of the local settings and the query settings can then be used when executing the instantiated calculation scenario.

The combined local settings and query settings can be combined with global settings pertaining to a plurality of calculation scenarios. The combination of the local settings, the query settings, and the global settings can be used when executing the instantiated calculation scenario.

Settings specified by the local settings object can, in some cases, take precedence over the global settings and the query settings when conflicts exist. Other conflict resolution rankings can also be utilized.

At least a portion of paths and/or attributes defined by the calculation scenario can, in some implementations, not be required to respond to the query. In such cases, the instantiated calculation scenario can omit the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool. The calculation engine can invoke an SQL processor for executing set operations.

An input for each calculation node can include one or more of: a physical index, a join index, an OLAP index, and another calculation node. Some or all calculation nodes can have at least one output table that is used to generate the data set. At least one calculation node can consume an output table of another calculation node.

The query can be forwarded to a calculation node in the calculation scenario that is identified as a default node if the query does not specify a calculation node at which the query should be executed. The calculation scenario can include database metadata.

The database can be a column oriented database. The database can be an in-memory database.

In addition, with the current subject matter, some of the global configuration settings for a calculation scenario can be overwritten by enhancing the calculation scenario with the changed settings and storing these settings with the scenario in the persistence. Furthermore, the current subject matter enables overwriting of global settings and calculation scenarios settings with the query (SQL statement). As a result, reading a specific setting can be done in a single call without the necessity to read global settings, scenario settings and query settings.

In another interrelated aspect, a query is received by a database server from a remote application server. The query is associated with a calculation scenario that defines a data flow model that includes one or more calculation nodes. The calculation nodes each define one or more operations to execute by a calculation engine on the database server. Thereafter, the database server instantiates a runtime model of the calculation scenario by accessing settings, and if necessary, resolving conflicts among the settings for the calculation scenario. The settings can include at least one: global settings, local settings specified by a local settings object stored with the calculation scenario, or query settings specified by the query. The database server next executes the operations defined by the calculation nodes of the instantiated calculation scenario to result in a responsive data set. The database server then provides the data set to the application server.

Computer program products are also described that comprise non-transitory computer readable media storing instructions, which when executed by one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, peer-to-peer wireless coupling, a local area network, a wide area network, a wired network, or the like), via a direct connection between one or more of the multiple computing systems, etc.

The subject matter described herein provides many advantages. For example, the current subject matter allows for distributed query execution framework configuration settings to be specified at various granularity levels including at a global level, per database instance, per calculation scenario, and down to a specific query.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
FIG. 1 is a process flow diagram illustrating a method for implementing hierarchical runtime settings.

FIG. 1 is a process flow diagram 100 in which, at 110 a query is received by a database server from a remote application server. The query is associated with a calculation scenario that defines a data flow model that includes one or more calculation nodes that each define one or more operations to execute by a calculation engine on the database server. Thereafter, at 120, the database server instantiates a runtime model of the calculation scenario by accessing a local settings object stored with the calculation scenario that specifies local settings for the calculation scenario. Subsequently, at 130, the database server executes the operations defined by the calculation nodes of the instantiated calculation scenario to result in a responsive data set. The data set can then, at 140, be provided by the database server to the application server.

Figure 2:
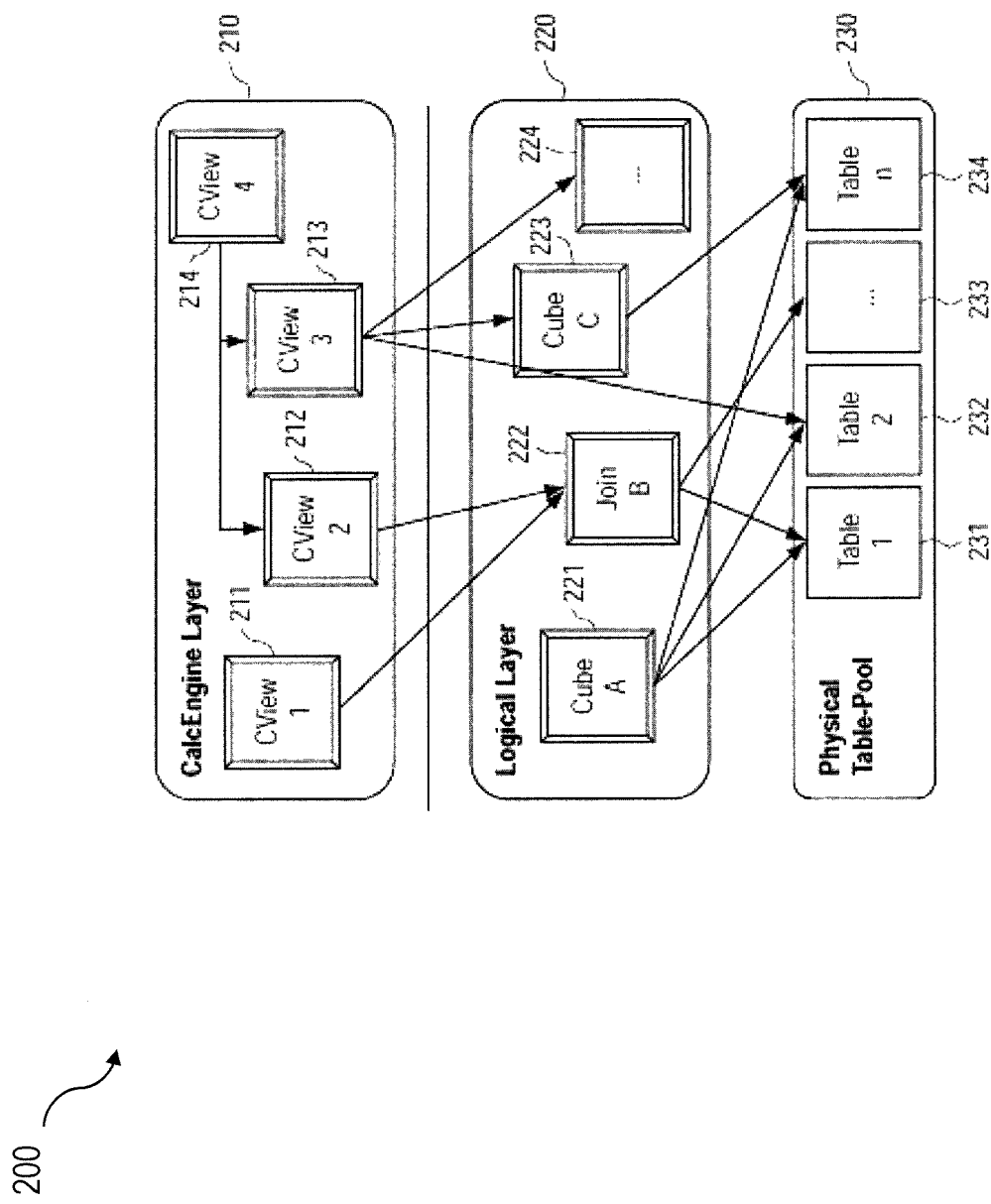
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In calculation scenarios, two different representations can be provided. First, a stored ("pure") calculation scenario in which all possible attributes are given. Second, an instantiated/executed model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Further details regarding calculation engine architecture and calculation scenarios can be found in U.S. Pat. No. 8,195,643, the contents of which are hereby fully incorporated by reference.

Figure 3:
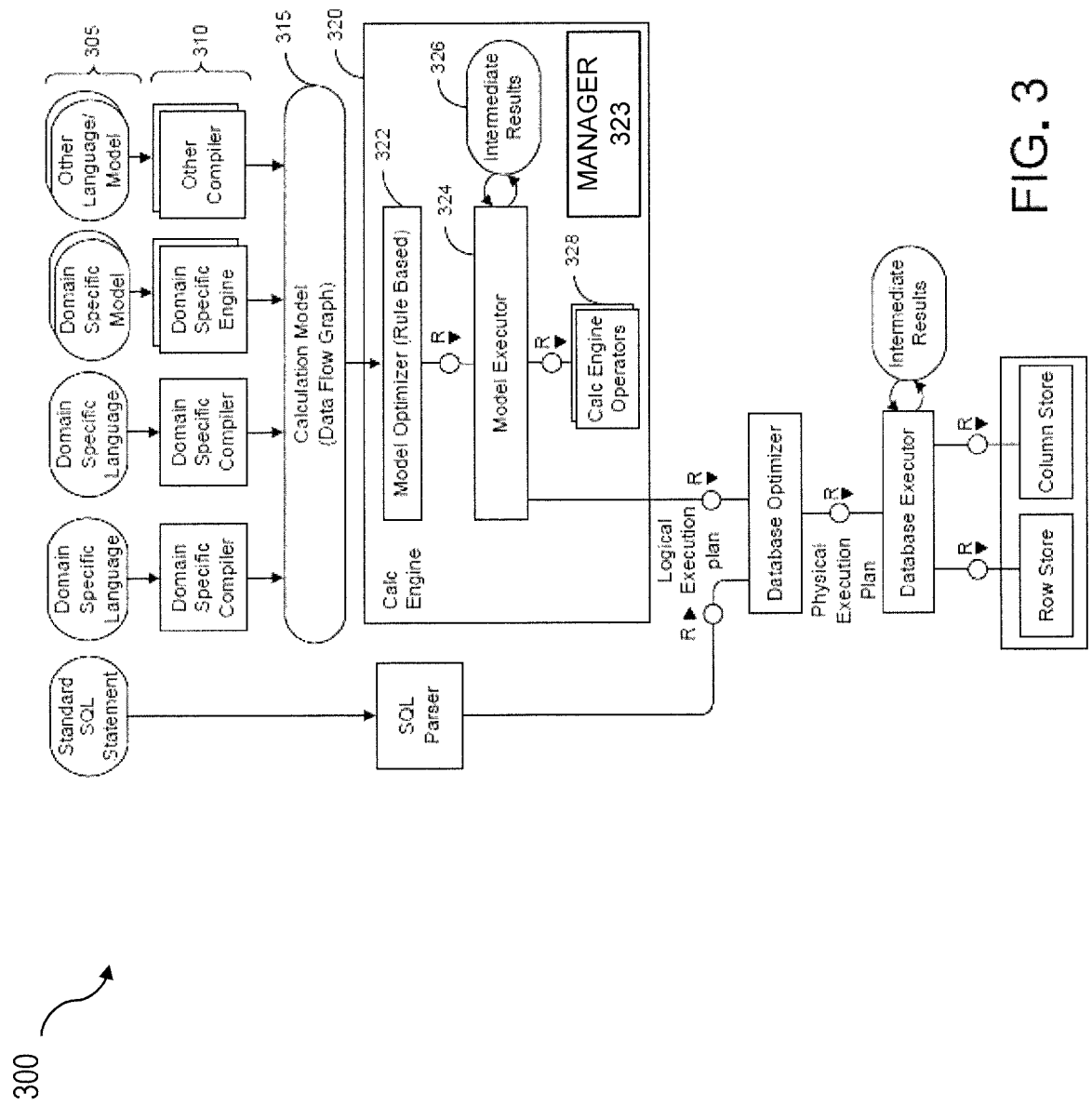
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The calculation engine 320 typically does not behave in a relational manner. The main reason for this is the instantiation process. The instantiation process can transform a stored calculation model 315 to an executed calculation model 315 based on a query on top of a calculation view which is a (catalog) column view referencing one specific node of a stored calculation model 315. Therefore, the instantiation process can combine the query and the stored calculation model and build the executed calculation model.

The main difference between a relational view or SQL with subselects and a calculation model is that the projection list in a relational view is stable also if another SQL statement is stacked on top whereas in a calculation model the projection list of each calculation node in the calculation model is depending on the projection list of the query or the parent calculation node(s).

With a calculation model 315, a user can provide a set of attributes/columns on each calculation node that can be used by the next calculation node or the query. If attributes/columns are projected in a query or on the parent calculation node, then just a subset of these requested attributes/columns can be considered in the executed calculation model.

The calculation engine 320 can include a calculation engine manager 323. The calculation engine manager 323 can allow for global access to a settings object that encapsulates configuration settings. The calculation engine manager 323 can be a central singleton instance which is responsible for calculation engine infrastructure and the calculation engine manager can ensure that the settings object represents global configuration settings. If the settings object is requested from the calculation manager 323, the settings object can be copied so that the requester gets its own copy of the settings. During copying of the settings object, a read lock can be acquired to block parallel writes (need write lock).

Within the calculation scenario, specific settings can also be stored in a settings object that is a member of a calculation engine runtime model. When the runtime model is initialized, the settings object from the calculation engine 320 can be requested. As mentioned above, this settings object from the calculation engine manager can hold the global settings and the stored calculation scenario settings (from the settings object) can be applied on these global setting (overwriting and enhancing the global settings).

If query settings are passed with the query (by extending the SQL statement with "WITH PARAMETERS"-clause), these query settings are also applied on the local settings object, held by the calculation engine runtime model object.

All further read or write accesses to the settings during query processing (beginning with the instantiation process, followed by query optimization up to the actual execution) is done with the calculation engine local settings object which, at this point, combines the global settings, the calculation scenario settings (if available in the calculation scenario) and the query settings (if provided with the query). As the settings object of the calculation engine runtime model is bound to the calculation engine runtime model instance, no locks are required to secure parallel access on the settings as is needed for the global settings provided by the calculation engine manager instance. It will be appreciated that because the calculation engine runtime model holds all settings one can easily determine the settings of a specific calculation scenario execution, even in a distributed environment; settings objects are serialized along with the calculation engine runtime model.

In addition, by using the calculation engine runtime model settings, for tests which require changed settings, no preparation (changing the required settings) and no clean up phase (reset settings to previous state) is needed since the required settings can be provided with the queries executed by the test. Furthermore, this arrangement prevents subsequent tests from running with incorrect settings (or not initial settings) because the settings, specified with the query, are not stored.

Stated otherwise, the current subject matter provides that global default settings (that pertain to how a calculation scenario is executed) with a defined scope which can be overruled by calculation scenario settings and/or query settings. This arrangement allows for a more fine-grained scope of settings (only for a specific calculation scenario or only for one single query). Furthermore, only the initial access to the global settings has to be secured by locking mechanisms. During query processing the access of the settings is memory local as the settings are part of a calculation engine runtime model. It is noteworthy that at the starting point of a query on the calculation scenario, the global settings for the query are frozen (due to the copy of the settings object). Thus, the execution of the calculation scenario is independent from the query runtime and potential changes of the global settings during query runtime.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
receiving, by a database server from a remote application server, a query associated with a calculation scenario, the calculation scenario defining a data flow model that includes one or more calculation nodes that each define one or more operations to execute by a calculation engine on the database server;
instantiating, by the database server, a runtime model of the calculation scenario, the instantiating comprising accessing a local settings object stored with the calculation scenario, the local settings object specifying local settings for the calculation scenario;
executing, by the database server, the operations defined by the calculation nodes of the instantiated calculation scenario to result in a responsive data set; and
providing, by the database server to the application server, the data set.

2. A method as in claim 1 further comprising:
combining, using the local settings object, the local settings with global settings pertaining to a plurality of calculation scenarios, wherein the combination of the local settings and the global settings are used when executing the instantiated calculation scenario.

3. A method as in claim 1, wherein the query has associated query settings, and wherein the method further comprises:
combining, using the local settings object, the local settings with the query settings, wherein the combination of the local settings and the query settings are used when executing the instantiated calculation scenario.

4. A method as in claim 3, further comprising:
combining the combined local settings and query settings with global settings pertaining to a plurality of calculation scenarios, wherein the combination of the local settings, the query settings, and the global settings are used when executing the instantiated calculation scenario.

5. A method as in claim 4, wherein settings specified by the local settings object take precedence over the global settings and the query settings when conflicts exist.

6. A method as in claim 1, wherein at least a portion of paths and/or attributes defined by the calculation scenario are not required to respond to the query, and wherein the instantiated calculation scenario omits the paths and attributes defined by the calculation scenario that are not required to respond to the query.

7. A method as in claim 1, wherein at least one of the calculation nodes filters results obtained from the database server.

8. A method as in claim 1, wherein at least one of the calculation nodes sorts results obtained from the database server.

9. A method as in claim 1, wherein the calculation scenario is instantiated in a calculation engine layer by the calculation engine.

10. A method as in claim 9, wherein the calculation engine layer interacts with a physical table pool and a logical layer, the physical table pool comprising physical tables containing data to be queried, and the logical layer defining a logical metamodel joining at least a portion of the physical tables in the physical table pool.

11. A method as in claim 9, wherein the calculation engine invokes an SQL processor for executing set operations.

12. A method as in claim 1, wherein an input for each calculation node comprises one or more of: a physical index, a join index, an OLAP index, and another calculation node.

13. A method as in claim 10, wherein each calculation node has at least one output table that is used to generate the data set.

14. A method as in claim 11, wherein at least one calculation node consumes an output table of another calculation node.

15. A method as in claim 1, wherein the executing comprises:
forwarding the query to a calculation node in the calculation scenario that is identified as a default node if the query does not specify a calculation node at which the query should be executed.

16. A non-transitory computer program product storing instructions which, when executed by at least one data processor of at least one computing system, result in operations comprising:
receiving, by a database server from a remote application server, a query associated with a calculation scenario, the calculation scenario defining a data flow model that includes one or more calculation nodes that each define one or more operations to execute by a calculation engine on the database server;
instantiating, by the database server, a runtime model of the calculation scenario, the instantiating comprising accessing a local settings object stored with the calculation scenario, the local settings object specifying local settings for the calculation scenario;
executing, by the database server, the operations defined by the calculation nodes of the instantiated calculation scenario to result in a responsive data set; and
providing, by the database server to the application server, the data set.

17. A computer program product as in claim 16, wherein the operations further comprise:
combining, using the local settings object, the local settings with global settings pertaining to a plurality of calculation scenarios, wherein the combination of the local settings and the global settings are used when executing the instantiated calculation scenario.

18. A computer program product as in claim 16, wherein the query has associated query settings, and wherein the operations further comprises:
combining, using the local settings object, the local settings with the query settings, wherein the combination of the local settings and the query settings are used when executing the instantiated calculation scenario;
combining the combined local settings and query settings with global settings pertaining to a plurality of calculation scenarios, wherein the combination of the local settings, the query settings, and the global settings are used when executing the instantiated calculation scenario;
wherein settings specified by the local settings object take precedence over the global settings and the query settings when conflicts exist.

19. A method comprising:
receiving, by a database server from a remote application server, a query associated with a calculation scenario, the calculation scenario defining a data flow model that includes one or more calculation nodes that each define one or more operations to execute by a calculation engine on the database server;

instantiating, by the database server, a runtime model of the calculation scenario, the instantiating comprising accessing settings, and if necessary, resolving conflicts among the settings for the calculation scenario, wherein the settings comprise global settings, local settings specified by a local settings object stored with the calculation scenario, and query settings specified by the query;

executing, by the database server, the operations defined by the calculation nodes of the instantiated calculation scenario to result in a responsive data set; and providing, by the database server to the application server, the data set.

20. A method as in claim 19, wherein settings specified by the local settings object take precedence over the global settings and the query settings when conflicts exist.

* * * * *